US012246328B2

(12) United States Patent
Simonson

(10) Patent No.: US 12,246,328 B2
(45) Date of Patent: Mar. 11, 2025

(54) SELF-CLEANING PIPELINE MAGNETIC SEPARATOR SYSTEM

(71) Applicant: 1773048 Alberta Ltd., Calgary (CA)

(72) Inventor: Roger M. Simonson, Calgary (CA)

(73) Assignee: 1773048 Alberta Ltd., Calgary (CA)

( * ) Notice: Subject to any disclaimer, the term of this patent is extended or adjusted under 35 U.S.C. 154(b) by 583 days.

(21) Appl. No.: 17/635,273

(22) PCT Filed: Aug. 13, 2020

(86) PCT No.: PCT/CA2020/051111
§ 371 (c)(1),
(2) Date: Feb. 14, 2022

(87) PCT Pub. No.: WO2021/026659
PCT Pub. Date: Feb. 18, 2021

(65) Prior Publication Data

US 2022/0288604 A1 Sep. 15, 2022

Related U.S. Application Data

(60) Provisional application No. 62/886,793, filed on Aug. 14, 2019.

(51) Int. Cl.
*B03C 1/28* (2006.01)
*B03C 1/02* (2006.01)
(Continued)

(52) U.S. Cl.
CPC .............. *B03C 1/284* (2013.01); *B03C 1/023* (2013.01); *B03C 1/0332* (2013.01); *B03C 1/286* (2013.01); *F17D 5/00* (2013.01); *B03C 2201/18* (2013.01)

(58) Field of Classification Search
CPC ....... B03C 1/284; B03C 1/023; B03C 1/0332; B03C 1/286; B03C 2201/18; F17D 5/00
See application file for complete search history.

(56) References Cited

U.S. PATENT DOCUMENTS

| | | | |
|---|---|---|---|
| 2,678,729 | A | 5/1954 | Spodig |
| 3,581,898 | A | 6/1971 | Tyrrell et al. |

(Continued)

FOREIGN PATENT DOCUMENTS

| | | |
|---|---|---|
| CA | 1207246 | 7/1986 |
| CA | 2031901 | 6/2001 |

(Continued)

OTHER PUBLICATIONS

International Search Report (ISR) and Written Opinion for PCT/CA2020/051111 dated Nov. 13, 2020 , 10 pages.

(Continued)

*Primary Examiner* — Youngsul Jeong
(74) *Attorney, Agent, or Firm* — Bennett Jones LLP

(57) ABSTRACT

A system, apparatus and method for magnetically separating a fluid flow passing through a pipeline are provided. A magnetic separator assembly having a plurality of elongate magnetic members is provided. Each magnetic member can have a first end and a second end. A cleaner plate can be provided that can move along the magnetic members. After the magnetic separator assembly is used to collect magnetic particles from a fluid flow in a pipeline, the magnetic separator assembly can be cleaned by sliding the cleaning plate along the magnetic members.

3 Claims, 10 Drawing Sheets

(51) Int. Cl.

| | |
|---|---|
| ***B03C 1/023*** | (2006.01) |
| ***B03C 1/03*** | (2006.01) |
| ***B03C 1/033*** | (2006.01) |
| ***F17D 5/00*** | (2006.01) |

(56) References Cited

U.S. PATENT DOCUMENTS

| | | | |
|---|---|---|---|
| 3,804,258 | A | 4/1974 | Okuniewski et al. |
| 3,841,489 | A | 10/1974 | Combest et al. |
| 3,850,811 | A | 11/1974 | Wheelock |
| 4,026,805 | A | 5/1977 | Fowler |
| 4,176,065 | A | 11/1979 | Cook |
| 4,394,264 | A | 7/1983 | Schimion et al. |
| 4,450,075 | A | 5/1984 | Krow |
| 4,543,114 | A | 9/1985 | Beattie et al. |
| 4,550,896 | A | 11/1985 | Hansen, III |
| 4,725,364 | A | 2/1988 | Hurley et al. |
| 4,883,591 | A | 11/1989 | Belasco |
| 5,188,239 | A | 2/1993 | Stowe |
| 6,077,333 | A | 6/2000 | Wolfs |
| 6,143,171 | A | 11/2000 | Van Aarsen |
| 6,638,425 | B2 | 10/2003 | Asterlin |
| 6,706,178 | B2 | 3/2004 | Simonson |
| 6,833,069 | B1 * | 12/2004 | Asterlin .................. B03C 1/284 210/512.1 |
| 8,628,668 | B2 | 1/2014 | Simonson |
| 2005/0035112 | A1 * | 2/2005 | Baxter .................... B03C 1/145 219/653 |
| 2006/0006106 | A1 | 2/2006 | White |
| 2008/0098490 | A1 | 4/2008 | Jakobovits et al. |
| 2010/0155336 | A1 | 6/2010 | Simonson |
| 2010/0294706 | A1 | 11/2010 | Simonson |
| 2011/0100923 | A1 * | 5/2011 | Jassal ........................ B03C 1/30 210/695 |
| 2016/0354790 | A1 * | 12/2016 | Hassell ................... F17D 1/088 |

FOREIGN PATENT DOCUMENTS

| | | | |
|---|---|---|---|
| CA | 2331559 | | 7/2002 |
| CN | 201020321 | | 2/2008 |
| DE | 102014104515 | A1 | 10/2014 |
| FR | 2710632 | A1 | 4/1995 |
| FR | 2718065 | A1 | 10/1995 |
| FR | 2793427 | A1 | 11/2000 |
| GB | 812873 | | 5/1959 |
| JP | 62087217 | | 4/1987 |
| JP | 11244626 | | 9/1999 |
| JP | 2003117311 | | 4/2003 |
| RU | 2196634 | | 1/2003 |
| RU | 2606645 | C1 | 1/2017 |
| WO | WO 2008/101352 | | 8/2008 |
| WO | 2013151415 | A1 | 10/2013 |

OTHER PUBLICATIONS

Written Opinion of the International Searching Authority for PCT/CA2008/000347, Jun. 2008.

International Preliminary Report on Patentability for PCT/CA09/00662, Nov. 17, 2010.

* cited by examiner

SELF-CLEANING PIPELINE MAGNETIC SEPARATOR SYSTEM

BENEFIT OF EARLIER APPLICATIONS

This application claims priority from U.S. provisional application 62/886,793, filed Aug. 14, 2019.

TECHNICAL FIELD

The present invention relates to pipeline separators using magnetic forces, specifically self-cleaning magnetic pipeline separators.

BACKGROUND

In the oil and gas industry throughout the world, hydrocarbon fluids, natural gas and methane are conveyed through transmission pipeline systems. The majority of such pipelines are manufactured with ferrous steel. Black powder is a problem with these oil and gas pipelines. These pipelines typically wear from the inside from corrosion and erosion and the operational life of a pipeline is directly correlated to the quality of the iron used and the quality of the manufacturing process. This corrosion and erosion causes the formation of black powder in the pipeline. Black powder may further erode the pipeline and create more iron-based particles. Black powder typically consists of various forms of iron sulfide and/or iron oxide and can also consist of some portion of silica dust and other materials. Another source of ferrous and/or non-ferrous black powder contamination may be a formation from which oil and/or gas is removed. The higher the quality of material and production capability the longer the pipeline will last. Lower grade material and production will result in higher amounts of black power forming and significantly reduced operational life.

Pipeline erosion is a serious problem. Some main causes of pipeline erosion include: the flow of gas or hydro carbon fluids creates friction through contact resulting in very fine particles (the black powder) down to and below 10 microns in size to be eroded from the pipe wall, then enter and suspend in the flow; the increase of the ferrous contamination (black powder) levels as the gas or hydrocarbon fluid travels along the pipeline system are directly correlated with the distance traveled and pipe quality; as the level of ferrous contamination suspended in the gas and or hydrocarbon fluid increases the opportunity and ability to erode the pipe wall increases significantly, which is due to the hardness factor of the ferrous contamination suspended in the flow.

Corrosion is another serious problem for pipelines. Moisture will accumulate as the temperature and humidity rise and fall. The moisture will oxidize the ferrous metal creating scaling on the surface of the pipe wall. The flow of the gas or hydrocarbon fluids breaks away the scale with the assistance of the fine ferrous contamination already suspended in the flow forming black powder traveling through the pipeline.

Again, the mitigating factor to the wear ratio is the quality of pipe and the distance traveled and the ferrous and non-ferrous (silica sand) contamination suspended in the flow.

The ferrous contamination (black powder) created by the transmission process creates additional serious operational problems with the process of transporting the gas or hydrocarbon fluid though the transmission line and can directly affect the quality of the medium flowing through the pipeline. A number of problems can arise from ferrous contamination: the gas and or hydrocarbon fluid quality can be degraded due to the level of ferrous contamination; the ferrous contamination can prematurely wear the meter gauges and in some cases plug the meter creating a serious issue of flow volume accuracy; the fine ferrous contamination can enter and settle in the flow control valves causing them to fail; the ferrous metal can prematurely wear pump, compressor, and turbine components along the transmission lines; the ferrous metal contamination can cause a multitude of problems when the gas and/or hydrocarbon fluid enters the refining process from pump and pipe wear to contamination of the by-product separation and production processes; and when the gas or hydrocarbon fluid is warehoused in ferrous steel reservoirs, it again is subject to ferrous metal contamination from corrosion.

One solution is to remove the ferrous contamination from as many opportune locations as possible along the pipeline system to reduce the accumulating negative impact it has on the pipeline, associated rotating equipment, and metering gauges. However, traditional filtration technology employed to date, such as cyclone or centrifuge filters and media filters, have proven to be expensive. They can also be inefficient and create flow restrictions. In some cases they can even collapse from back pressure created when they become plugged.

SUMMARY OF THE INVENTION

In accordance with a broad aspect of the present invention, there is provided an apparatus for magnetically separating a fluid flow passing through a pipeline, the system comprising: a housing for connection inline with the pipeline and including an inner chamber defining an internal flow path for the fluid flow passing through the pipeline to pass through the housing, the housing having an inlet and an outlet for fluid communication with the pipeline; a magnetic separator assembly in the inner chamber having a header and a magnetic member attached to the header at a first end and extending away from the header to a second end; a cleaning plate having an aperture extending through the cleaning plate, the aperture positioned on the cleaning plate to correspond with the magnetic member so that the magnetic member can slide through the aperture in the cleaning plate and the cleaning plate can be moved along the magnetic member; a driver for the cleaning plate adapted to slide the cleaning plate back and forth along the magnetic member from proximate the first end to proximate the second end; a nozzle in the housing, adapted to direct a spray stream onto the magnetic member; and a drain on the housing.

In accordance with another broad aspect of the present invention, there is provided an apparatus for magnetically separating a fluid flow passing through a pipeline, the system comprising: a housing, being made of a magnetically attractive material, for connection inline with the pipeline and including an inner chamber defining an internal flow path for the fluid flow passing through the pipeline to pass through the housing, the housing having an inlet and an outlet for fluid communication with the pipeline; a magnetic separator assembly in the inner chamber having a header and a magnetic member attached to the header at a first end and extending away from the header to a second end; a sleeve sized to fit within the housing and around the magnetic member, the sleeve being made of a material selected to shield a magnetic field produced by the magnetic member from the housing; and a drain on the housing.

It is to be understood that other aspects of the present invention will become readily apparent to those skilled in the art from the following detailed description, wherein various embodiments of the invention are shown and described by way of illustration. As will be realized, the invention is capable of other and different embodiments and its several details are capable of modification in various other respects, all within the present invention. Furthermore, the various embodiments described may be combined, mutatis mutandis, with other embodiments described herein. Accordingly, the drawings and detailed description are to be regarded as illustrative in nature and not as restrictive.

BRIEF DESCRIPTION OF THE DRAWINGS

Referring to the drawings wherein like reference numerals indicate similar parts throughout the several views, several aspects of the present invention are illustrated by way of example, and not by way of limitation, in detail in the figures, wherein.

(a)

(b)

(c)

(d)

(e)

(f)

(g)

(h)

(i)

(j)

(k)

(l)

(m)

DETAILED DESCRIPTION OF EMBODIMENTS

The detailed description set forth below in connection with the appended drawings is intended as a description of various embodiments of the present invention and is not intended to represent the only embodiments contemplated by the inventor. The detailed description includes specific details for the purpose of providing a comprehensive understanding of the present invention. However, it will be apparent to those skilled in the art that the present invention may be practiced without these specific details.

Due to the high flow rate and volume of fluid that can be transmitted through gas pipelines and the high viscosity oil transmitted through oil pipelines, very large magnetic separators with powerful magnetic fields may be required to be employed to realize efficient separation.

Housing, Flow Path, and Magnetic Members

Figure 1:
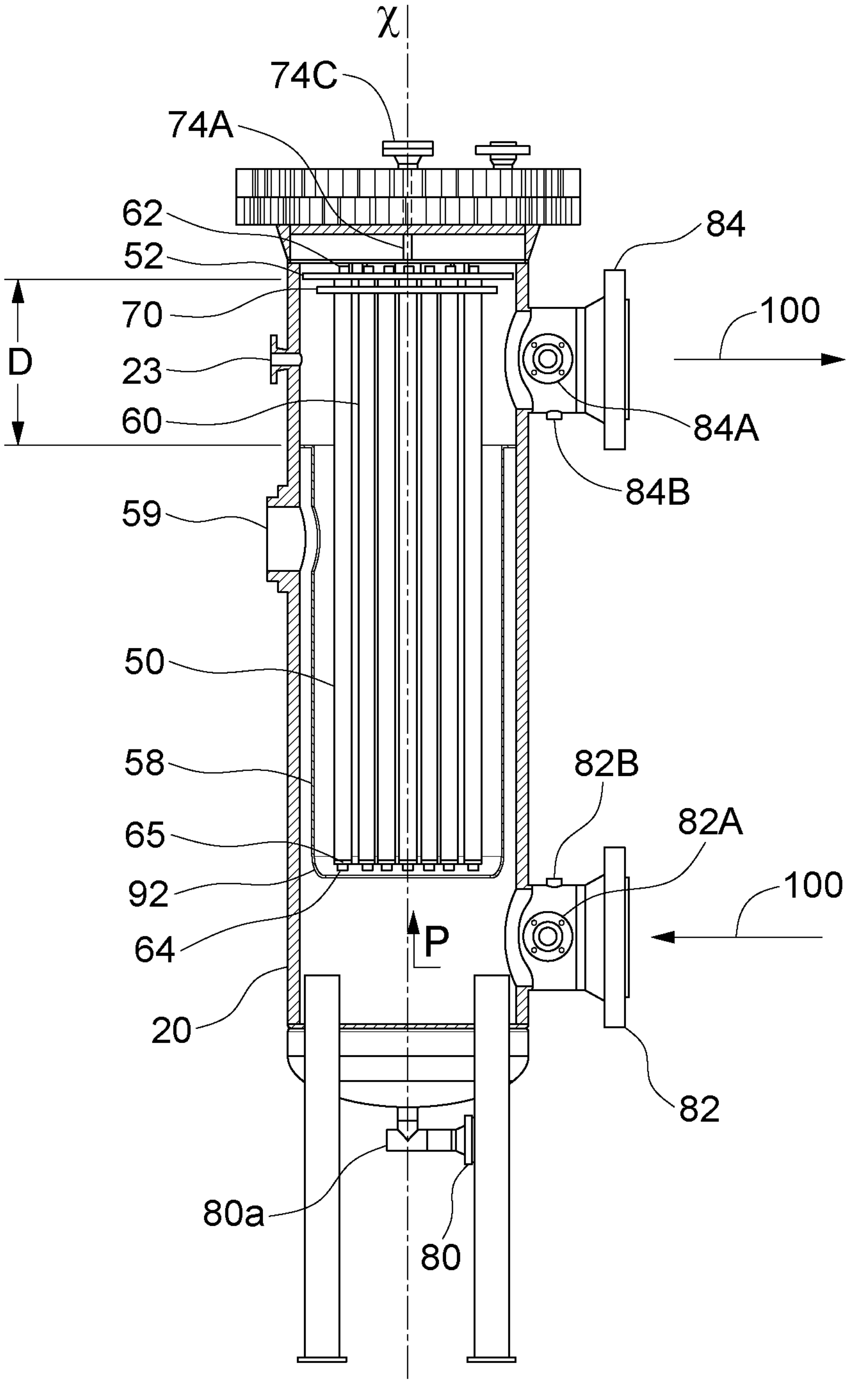
FIG. 1 is a partly cutaway schematic elevation illustration of a magnetic separation system installed in a pipeline.

FIG. 1 illustrates a magnetic separation system 10 in one aspect. The magnetic separation system 10 employs powerful magnets to remove particles of magnetic material from a fluid flow, such as an oil or gas flow, passing through a pipeline 100. Magnetic material may include, for example, one or more of ferrous particles, paramagnetic particles, and diamagnetic particles, which may already be magnetically charged and/or may be electrically-magnetically charged as a result of their fluid flow, prior to and/or during their flow through the magnetic separation system. The magnetic separation system 10 can have a magnetic separator assembly 50 that is installable in a housing 20. The magnetic separation system 10 may allow exposure to a fluid flow, such as gas or hydrocarbon fluids, passing through the pipeline 100 without significantly impeding the fluid flow. The magnetic separation system 10 may be capable of extracting and holding large volumes of ferrous metal contamination.

The housing 20 is connected inline of the pipeline 100 and has an inner chamber that defines a flow path P through which a fluid flow passing through the pipeline 100 can pass through the housing 20. An inlet 82 and outlet 84 can be provided in the housing 20 in fluid communication with the flow path P.

The inlet and outlet may be spaced apart on the housing to ensure that fluid is forced to pass through housing 20 and through members 60. The inlet and outlet may be opposite one another with respect to the housing. The inlet and outlet may be on the same side of the housing, with the outlet either above or beneath the inlet.

In a further aspect, the flow path P defined by the housing 20 may be larger in diameter than the pipeline 100 for the purpose of creating a larger volume for the gas or fluid passing through the pipeline 100 to expand into, thereby slowing down the flow of the fluid while the fluid is passing through the flow path P in the housing 20. As the fluid passes through the flow path P, the fluid is exposed to the magnetic members 60 of the magnetic separator assembly 50. In one embodiment, the flow path's diameter may be ⅓ larger than the diameter of the pipeline 100. In such an embodiment, the chamber forms an expander from the pipeline 100, where the flow path P expands to meet the larger diameter of the inner chamber in the housing 20 and then narrows to once again correspond with the diameter of the pipeline 100, respectively.

Figure 5:
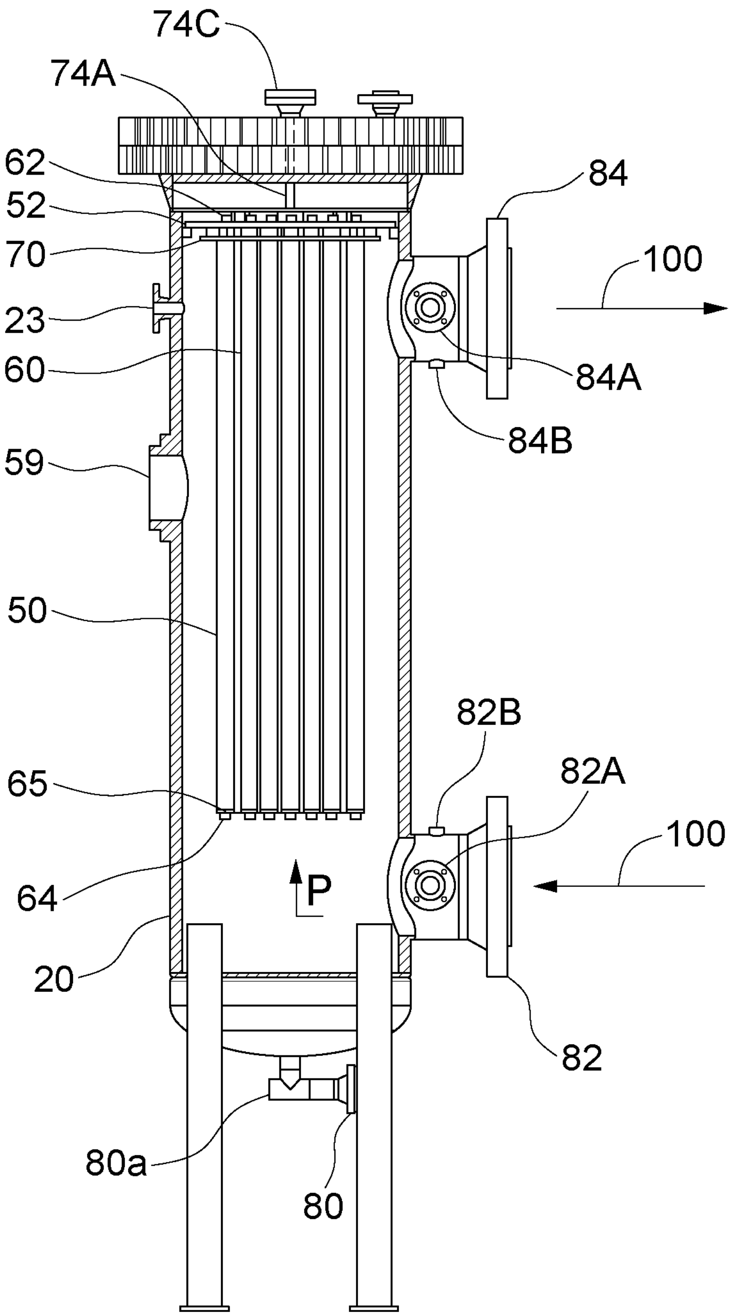
FIG. 5 is a partly cutaway schematic elevation illustration of another magnetic separation system.

The inlet may include a flush port 82*a*, as illustrated in FIG. 5, which may be for disposal of some of the contamination material and any number of materials used or collected during operation. The outlet may include a purge port 84*a*, which may be for disposal of some of lingering chemicals and any number of materials used or collected during operation. The flush port and/or the purge port may each have a nozzle for delivering a stream of fluid, which may act similar to nozzle 23, to facilitate removal and/or treatment of debris.

The inlet may include a gauge port 82*b*, and/or the outlet may include a gauge port 84*b*. The gauge ports, which may be accessible from an outer surface of the inlet and/or outlet, may be couplable to a gauge, such as a differential pressure gauge, for measuring pressure, which may be useful for monitoring the apparatus during operation.

In one embodiment, a drain 80 may be on the housing, for example at the bottom of the housing. The drain may include pump 80*a* to control the speed at which fluid may pass through the drain, for example to actively pump fluid from the inner chamber of the housing.

FIGS. 1 and 2 illustrate the magnetic separator assembly 50 in one aspect. The magnetic separator assembly 50 can have a header 52. The magnetic separator assembly 50 may also include a number of elongate magnetic members 60, which may have a rod shape, having first ends 62 and second ends 64. Members 60 can be attached to the header 52 at their first ends 62. The magnetic members 60 may extend from the header 52 downwards, terminating at their second ends 64. Each of the magnetic members 60 is a powerful magnet to attract metal materials to the magnetic members 60. With reference to FIG. 2*d*, the magnetic members 60 can be attached to the header 52 with spaces between them, such that they are spaced across the header 52. In this manner, magnetic fields 55 generated by the magnetic members 60 can be made to border each other and even overlap. In one aspect, the magnetic members 60 can be attached to the header 52 in an arrangement that forms a magnetic field with a shape characterized by a number of overlapping circles. There may be a spacer web 65 attached to the magnetic members, thereby coupling and spacing the second ends 64. The spacer web 65 secures the magnetic members in position, preventing the magnetic members from flexion and deformation. The spacer web may have a web shape.

In operation, the magnetic separator device 50 can be installed in the housing 20 with the second ends 64 of the magnetic members 60 extending into the flow path P defined by the housing 20. While a fluid flow is being transported through the pipeline 100 and through the flow path P defined by the housing 20, the fluid flow can pass between the magnetic members 60 of the magnetic separator assembly 50 that are extending into the flow path P. Magnetic material, such as ferrous particles, present in the fluid flow and passing between the magnetic members 60 can be magnetically attracted to the magnetic members 60 and can become attached to the magnetic members 60, thereby removing these particles from the fluid flow. As fluid continues to pass through the flow path P defined by the housing 20 and past the magnetic members 60 of the magnetic separator assembly 50, particles of metal material in the fluid can continue to be removed from the fluid flow.

Static electricity, although often undesirable, is sometimes present in oil and gas pipelines. In some cases, non-ferrous or normally non-magnetic materials may be given a static charge in these pipelines and this static charge can cause the magnetic separation system 10 to attract some of the statically charged non-ferrous materials and remove them from the flow through the pipeline in addition to the particles of magnetic material, such as ferrous particles. A flow in a pipeline with a static charge may have the static charge reduced as a result of contact with the magnetic separation system 10.

Flow Diverters

The flow path through the housing may be influenced, such as by baffles, piping, etc., to ensure good contact between the fluid flow and magnetic fields 55. The inlet and/or outlet may be positioned according to a desired flow path and/or to adapt to the configuration of the pipeline. In one embodiment, shown in FIG. 3, the flow path may be partially defined by a tube 26 extending from its opening 27 proximate the first ends 62, axially downwards to a bend 28, which bends radially outwards towards the outlet 84. In such an embodiment, unfiltered flow from the pipeline may pass from the inlet 82, past the magnetic members, into the tube and through the outlet, thereby defining flow path P'.

Figure 3:
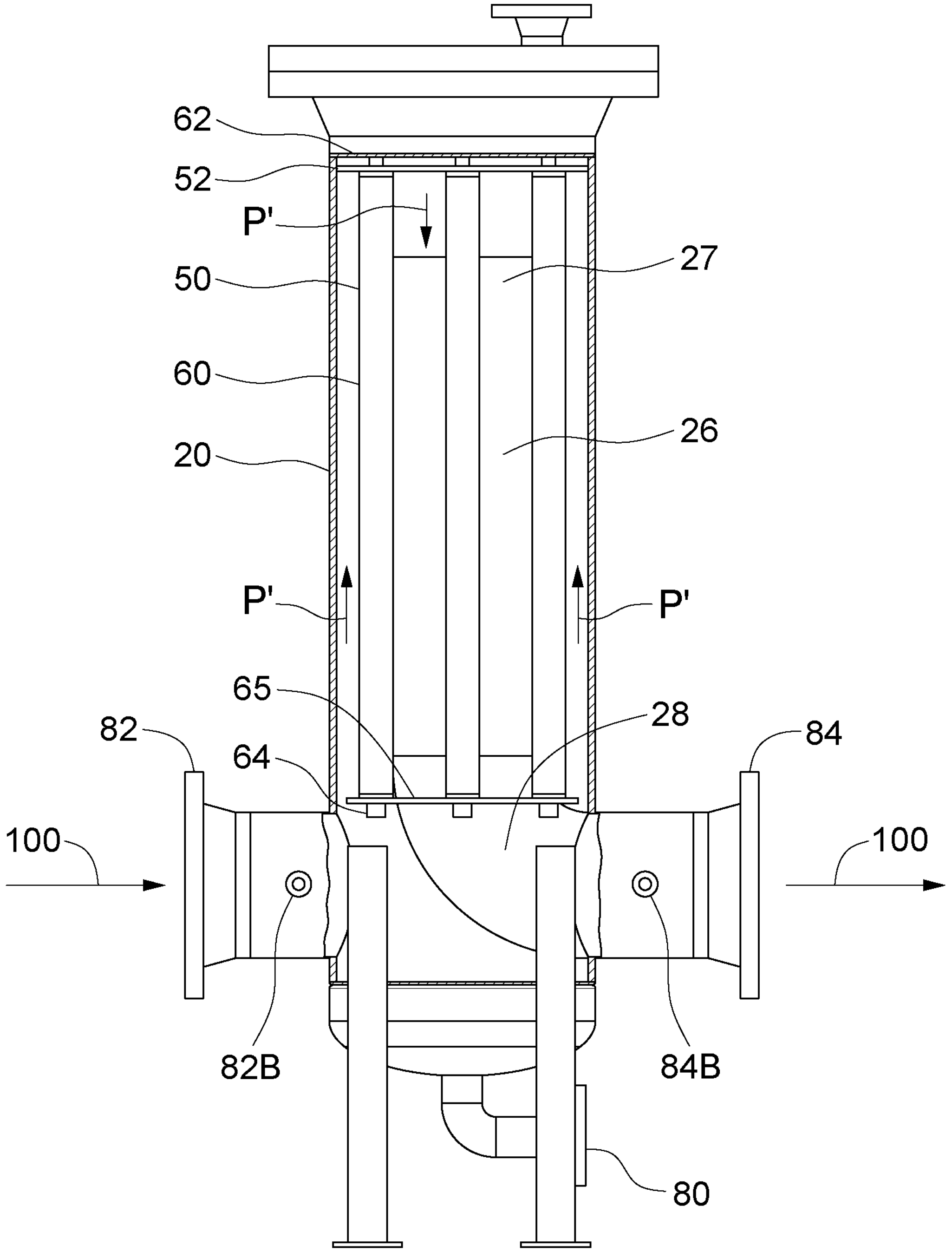
FIG. 3 is a partly cutaway schematic elevation illustration of another magnetic separation system.

The magnetic members may be positioned uniformly around the tube, as illustrated in FIG. 3. The tube may be positioned at or near the centre of the plurality of magnetic members.

Figure 7A:
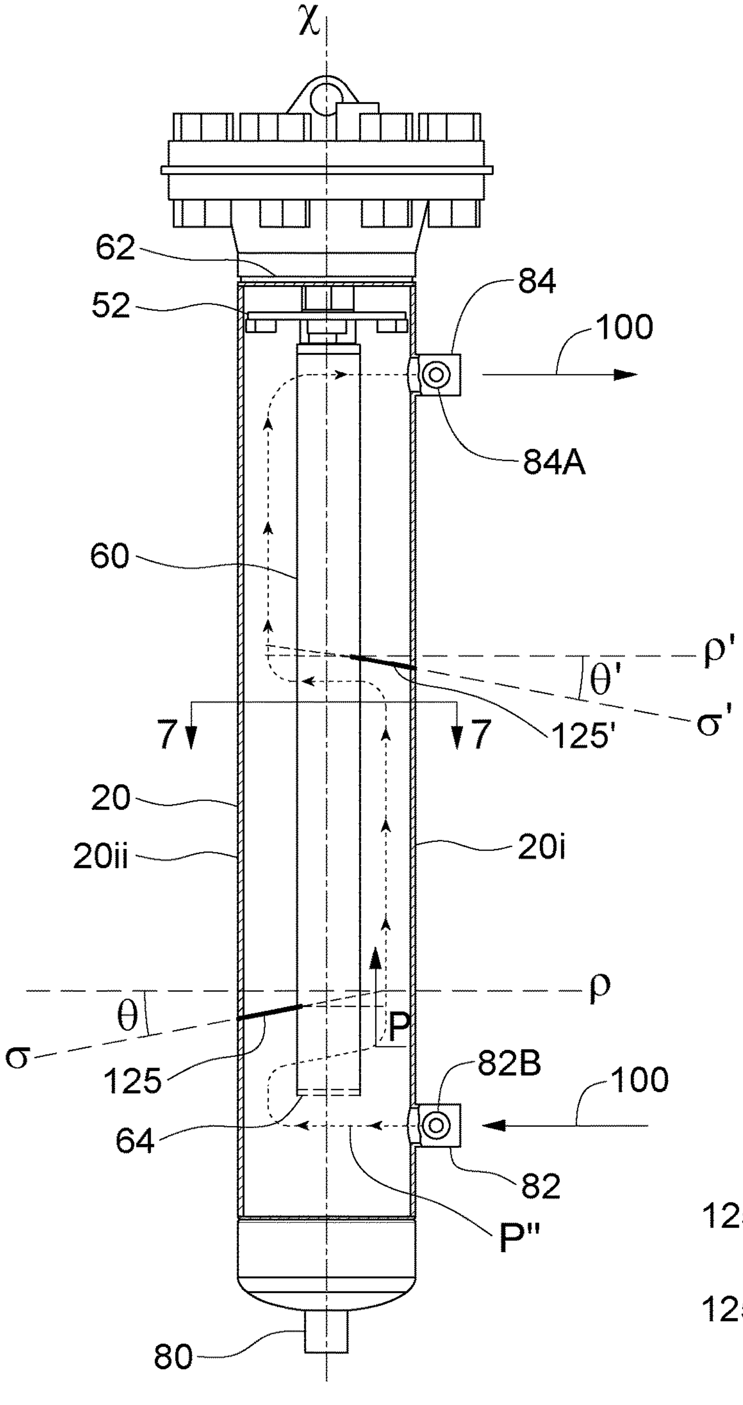
FIG. 7A is a partly cutaway elevation view of a magnetic separation system with flow diverters; and (o)
Figure 7B:
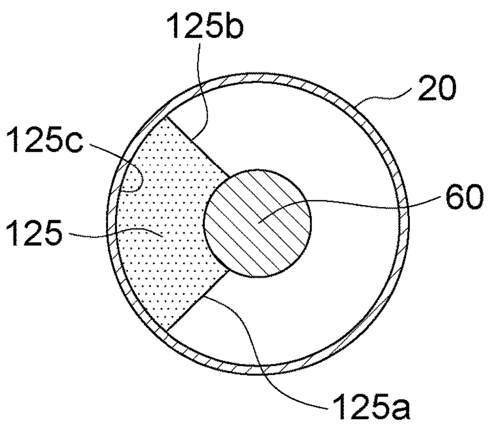
FIG. 7B is a cross sectional view along line 7-7 of FIG. 7A of the magnetic member, flow diverter, and housing of the embodiment of FIG. 7A.

With reference to FIGS. 7A and 7B, the invention may include one or more flow diverters 125 for directing fluid towards the one or more magnetic members, that is, for affecting flow path P". The flow diverters may cause fluid to be redirected (in other words, diverted) along a tortuous path, which may promote contact with the magnetic members so that more ferrous material may be collected. Each flow diverter is a structure within the housing that causes fluid flow to be directed around the flow diverter. Each flow diverter may be a substantially planar member. Each flow diverter may have a pie shape (in other words, a sector shape) with edges 125*a*, 125*b*, extending from proximate magnetic member 60 to proximate housing 125. Accordingly, each flow diverter may have a third edge 125*c* proximate the housing, which may have an arc shape. Each third edge 125*c* may be mounted to the housing such that its flow diverter 125 may extend toward magnetic member 60.

Each flow diverter may be oriented on a plane that intersects with axis $\chi$ of the housing at an angle. FIG. 7A illustrates an embodiment of the invention with one magnetic member 60 that is concentric with housing 20, inlet 82 at the lower end of the housing, and outlet 84 at the upper end of the housing. A first flow diverter 125 occupies a plane $\sigma$ oriented at an angle $\theta$, angle $\theta$ being measured relative to a plane $\rho$ perpendicular to axis $\chi$.

A second flow diverter 125' may be positioned axially above first flow diverter 125 on plane a $\sigma'$ oriented at an angle $\theta'$ relative to plane $\rho'$ (plane $\rho'$ being substantially parallel to plane $\rho$). The first flow diverter and second flow diverter may be oriented at different radial and/or axial positions relative to axis $\chi$. In the illustrated embodiment, first flow diverter 125 is positioned axially lower than second flow diverter 125'. First flow diverter 125 may be axially closer to the inlet than the outlet, and second flow diverter 125' may be axially closer to the outlet than the inlet. First flow diverter 125 may be positioned on side 20*ii* of housing substantially radially opposite the inlet with respect to axis $\chi$, and second flow diverter 125' may be positioned substantially radially opposite the first flow diverter 125 (that is, second flow diverter 125' may be on the same side 20*i* of axis $\chi$ as the inlet and outlet, the inlet and outlet having substantially the same radial position relative to axis $\chi$).

In use, fluid flows along path P" from pipeline 100, via inlet 82, into housing 20, and out of outlet 84, back to pipeline 100. Fluid generally flows upward because the inlet 82 is below outlet 84. Depending on the pressure of the fluid flowing from the pipeline, as fluid flows upward, fluid may tend to travel from the inlet on side 20*i* past axis $\chi$ towards side 20*ii*. The radial position of flow diverter 125 on side 20*ii* (being substantially opposite the radial position of inlet 82) forces fluid to flow towards side 20*i* as the fluid travels upward. Flow diverter 125', being on side 20*i*, then forces fluid to flow towards side 20*ii* as the fluid continues upward. Finally, fluid flows back towards side 20*i* to outlet 84 and pipeline 100. The axial and radial positions of the flow diverters are provided as examples only, and any number of positions and orientations are possible, depending on factors including the positioning of inlets and outlets, without departing from the scope of the invention. The flow diverters may cause the flow path to be longer and/or more turbulent, thereby promoting increased contact of the fluid with the magnetic member, permitting the magnetic member to collect a greater amount of contamination from the fluid.

Sleeve

Also to direct the flow of fluid, for example to the centre of the housing and into good contact with the magnetic fields, a sleeve 58 may be positioned within the housing, to line the housing, and surround the plurality of magnetic members 60. The sleeve may be configured as a liner of the housing, having a shape selected to fit close to the housing inner wall within the housing. Along the perimeter of the sleeve, there may be a substantially constant radial distance between the sleeve and the inner wall of the housing. In the illustrated embodiments, housing 20 and sleeve 58 each have cylindrical shapes and share a common centre axis $\chi$. Sleeve 58 has a smaller diameter than housing 20. Sleeve 58 may extend from a distance D below the header 52 to the second ends 64. Distance D may be selected to allow fluid communication from the first ends 62 to the outlet 84. Sleeve 58 may have a tapered lower end 92 that directs the flow of fluid to the centre of the magnetic fields of magnetic members 60. The tapered lower end may also provide structural support to the sleeve, which may, for example, allow the sleeve to be made of a thinner and/or lighter material.

Sleeve 58 may be made of a material selected to shield the magnetic field produced by the magnetic members from the housing to allow the housing to be made of a cheaper, ferrous material without being influenced by the magnetic fields. In other words, the sleeve may act as a shield to minimize the magnetic members' impact on the housing, which in this embodiment is also made of a magnetically attractive material. Without the sleeve, the magnetic field of the magnetic members could cause the housing, the magnetic members, or both to flex or deform. The sleeve may act to reduce the magnetic communication between the housing and the magnetic members, and thereby reduce any flexion or deformation of the housing, magnetic members, or both. The material of the sleeve may include stainless steel, polymers, etc., and/or the material of the housing may include carbon steel, etc.

Of course, the material used to fabricate the housing 20, and other components, can be non-magnetically attractant materials such as of polymers or stainless steel. However, the inclusion of sleeve 58 permits less expensive materials to be used to fabricate housing 20.

Cleaning

The size and strength of magnetic separator assemblies 50 can create an environment that may become dangerous for technicians to handle by hand for cleaning and the weight of each magnetic separator assembly 50 can exceed the weight limits for human handling. Also, the magnetic field strength of each magnetic separator assembly 50 may cause injury if the technician comes between the magnetic separator assembly 50 and a ferrous metal structure. Therefore, it would promote safety if magnetic separator assemblies could be cleaned with minimal physical manipulation by the technician. The present cleaning options allow for minimal human contact to the magnetic separation system 10 and no exposure to the magnetic fields or the contamination. The ferrous build up on magnetic members can be removed without human contact. This is an advantage over many other filter systems known in the art, which require a technician to directly contact contamination, including ferrous material.

Spray Nozzle

A spray nozzle 23 may be positioned in the housing and adapted to spray a spray stream into the housing, for example, onto the magnetic members. The spray stream may be selected to remove ferrous contamination from the magnetic members. In one embodiment, the spray nozzles may be positioned proximate the top of the housing. The spray nozzles may be positioned on the opposite side of the housing relative to the outlet. The spray stream may be delivered at a pressure selected to remove ferrous contamination from the magnetic members to flush out the cleaned debris. The spray stream may include one or more chemicals selected to treat the contamination material on the magnetic members. In some cases, contamination material on the magnetic members may be reactive (for example, pyrophoric) with air. In such cases, the spray stream may include a chemical to prevent pyrophoric contamination from reacting with air. In embodiments with a sleeve, such as sleeve 58, the spray nozzle may be positioned on the housing axially above sleeve 58 and below the header 52, that is, on the housing within axial distance D from the header 52.

Cleaning Plate

Referring to FIGS. 1 and 2, system 10 can further include a cleaning plate 70 (FIG. 1), 70' (FIG. 2) and a driver 74 therefor. When ferrous material has accumulated on the magnetic members, the cleaning plate may be used to remove such ferrous material. To clean the magnetic members, the cleaning plate may move from the first ends to the second ends, scraping ferrous material from the magnetic members.

One difference between the cleaning plates 70, 70', shown in FIGS. 1 and 2, respectively, is that the cleaning plate 70' of FIG. 2 is configured to accommodate four magnetic members, whereas the cleaning plate 70 of FIG. 1 is configured to accommodate more than four magnetic members. Cleaning plate 70 can include a plurality of apertures 72, which can be spaced apart on, and extend through, cleaning plate 70. There is an aperture 72 for each member 60 and apertures 72 are spaced on the cleaning plate 70 to correspond to the locations of the magnetic members 60 extending from the header 52, so the members 60 can each be inserted through and reside positioned in one aperture. The cleaning plate can be sized to substantially match the size of the header 52. The plate, with one member in each aperture, can be moved relative to the members towards or away from header 52. For example, cleaning plate 70 can be positioned at the second ends 64 of the magnetic members 60 and the apertures 72 in the cleaning plate 70 aligned with the magnetic members 60. With the apertures 72 in the cleaning plate 70 aligned with the magnetic members 60, the magnetic members 60 can be slid through the apertures 72. The cleaning plate 70 can thereby be slid from the second ends 64 of the magnetic members 60, along the length of the magnetic members 60, towards the first ends 62 of the magnetic members 60 until the cleaning plate 70 is positioned adjacent to the header 52.

To clean the magnetic separator assembly 50, the driver 74 may be connected to move the cleaning plate 70 along the members 60. For example, the driver may be connected to act between the header or housing 20 and the cleaning plate. The driver 74 may move the cleaning plate 70 from the first ends 62 to the second ends 64, moving the apertures 72 along the magnetic members 60, thereby scraping off particles of magnetic material from magnetic members 60.

Scraper Ring

A cleaning plate may include a laterally moveable, such as resiliently deformable or biased, scraper **70*r* in each aperture 72. Scraper 70*r*, being laterally moveable, may promote good contact with, and accommodate deformation and flexion of, its rod 60. The scraper may have a ring shape and may have an inner diameter substantially the same as an outer diameter of the magnetic member on which it acts. With reference to FIGS. 2A-2G, in use, as the cleaning plate 70' slides along magnetic members 60, the scraper deforms to follow and ride closely along the outer surface of the rod. Thereby, scraper 70***r* scrapes the ferrous material off of the magnetic member on which the scraper is acting.

The scraper 70*r* may be installed in the cleaning plate in various ways. In one embodiment for example, cleaning plate 70' may further include a top plate 70*t*, a middle plate 70*m*, and a bottom plate 70*b*. Each of the apertures 72 may be defined by holes through the three plates. That is, there may be a top hole in the top plate defined by edge 70*h*, a middle hole in the middle plate, and a bottom hole in the bottom plate. The top, middle, and bottom holes are each in the same position on their respective plates such that the holes may be axially aligned, having substantially the same centre points. The top and bottom holes may have a smaller diameter than the middle hole. Scraper 70*r* may be positioned within the middle hole and secured between the top plate and the bottom plate. The scraper may have an outer diameter larger than the diameters of the top and bottom holes. The scraper may be capable of lateral movement within the middle hole. The scraper may be sized such that it cannot pass through either of the top hole and the bottom hole. As noted above, the scraper's ability to move laterally within the middle hole allows the cleaning plate to flex and clean magnetic members that may have become misaligned, warped, or otherwise deformed. There may be any number of top, middle, and bottom plates, as well as additional or fewer plates.

Figure 2A:
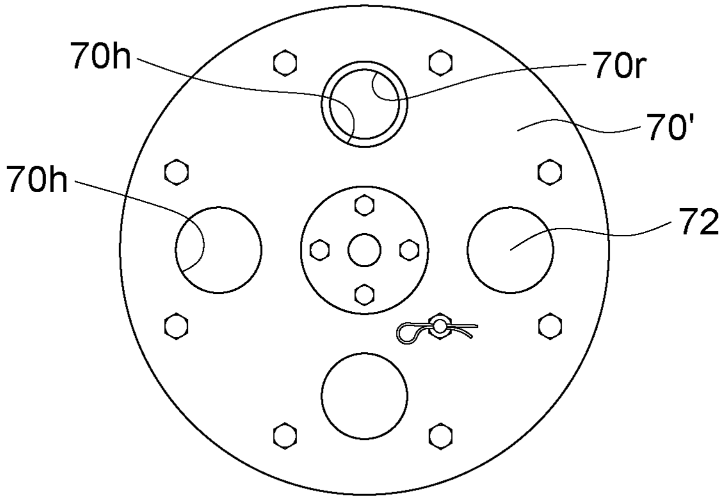
FIG. 2*a* is a plan view of a cleaning plate with a scraper according to one embodiment of the present invention.
Figure 2B:
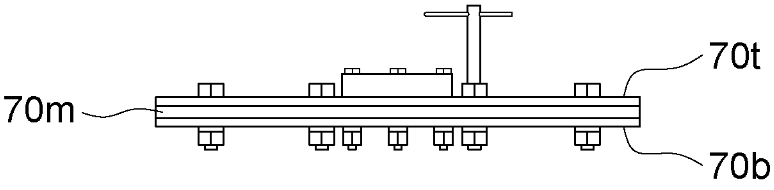
FIG. 2*b* is an elevation view of the cleaning plate of FIG. 2*a;*
Figure 2C:
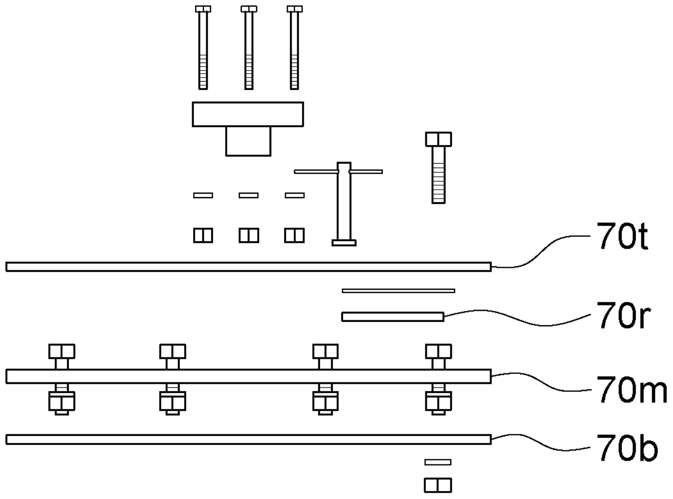
FIG. 2*c* is an exploded elevation view of the cleaning plate of FIG. 2*a;*
Figure 2D:
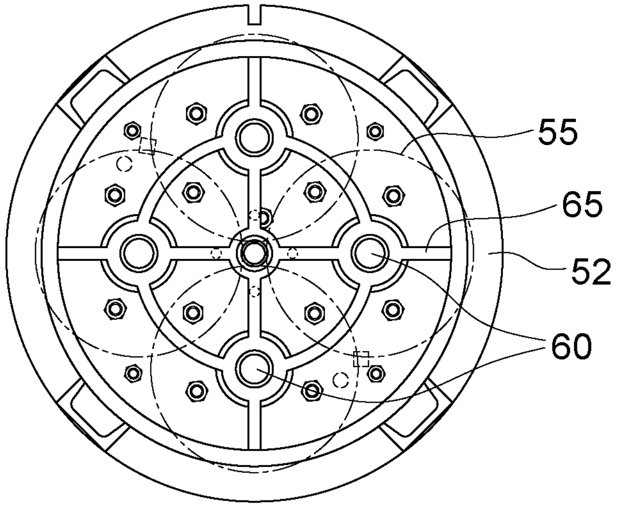
FIG. 2*d* is a bottom plan view of a header and magnetic rods.
Figure 2E:
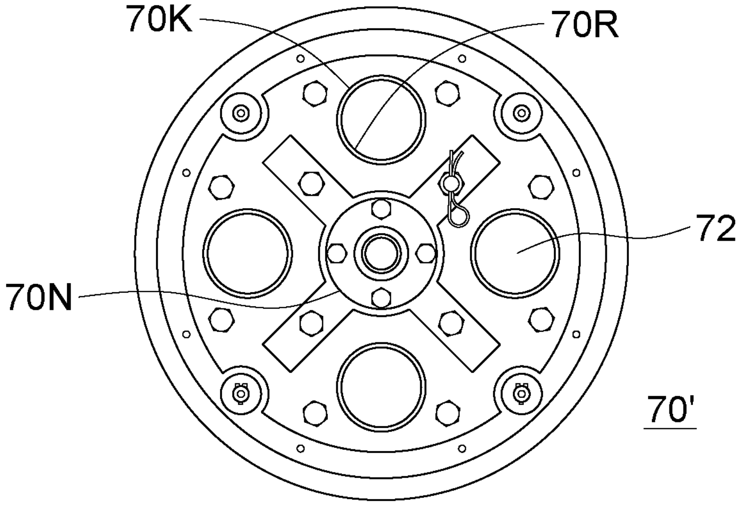
FIG. 2*e* is a plan view of a cleaning plate with a scraper according to another embodiment of the present invention.
Figure 2F:
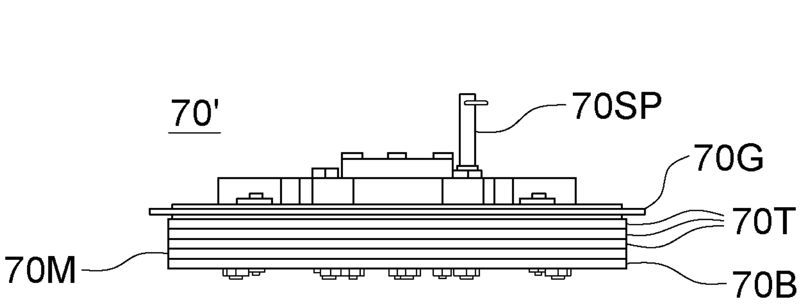
FIG. 2*f* is an elevation view of the cleaning plate of FIG. 2*e;*
Figure 2G:
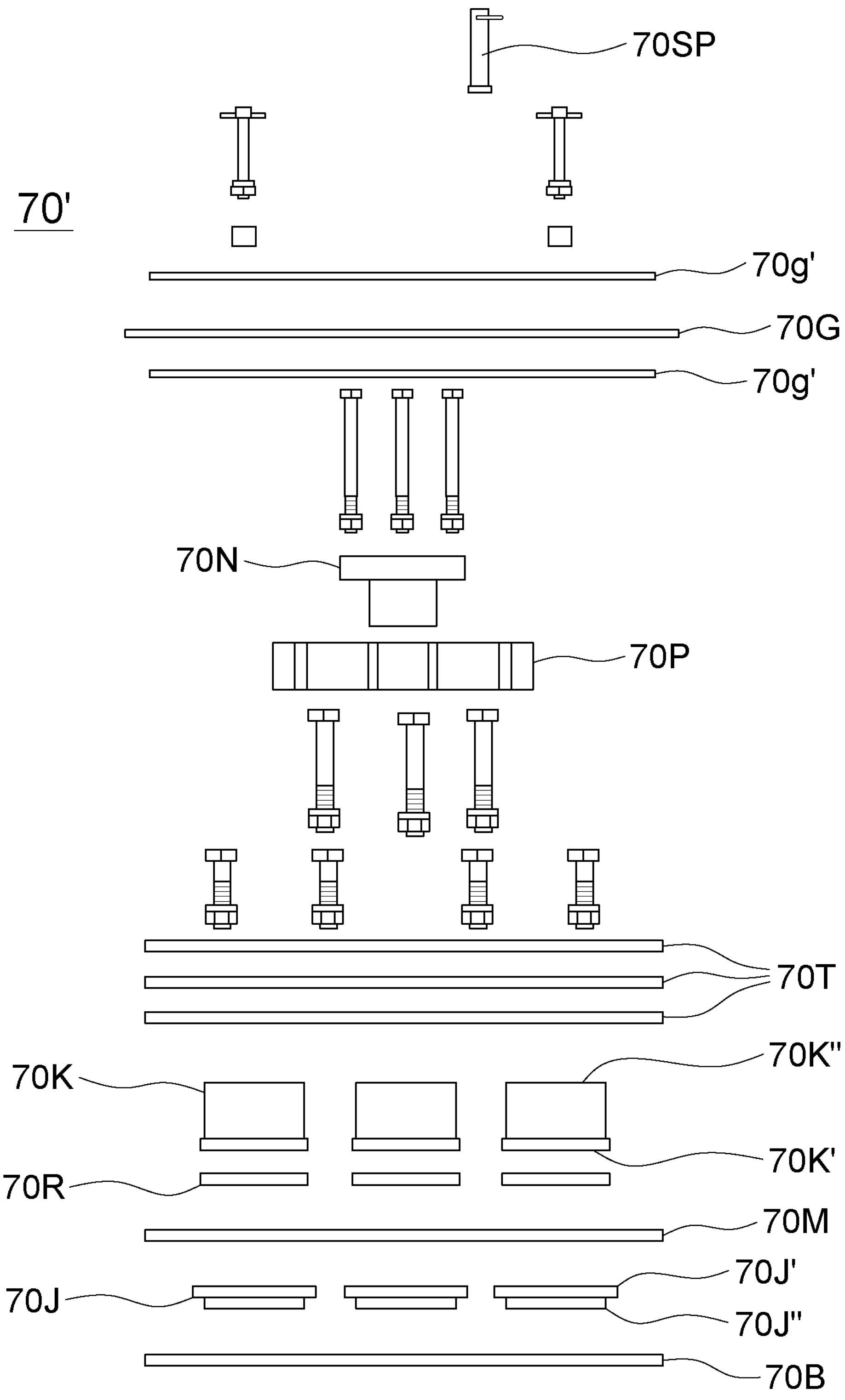
FIG. 2*g* is an exploded elevation view of the cleaning plate of FIG. 2*e;*

As illustrated in FIG. 2G, scraper r may be installed in a guide assembly, which may encourage the cleaning plate to remain perpendicular to axis $\chi$ even when, during use, contamination load on the plate is uneven. A guide assembly includes a tubular member installed substantially concentrically with respect to the edge of any one of the apertures. The tubular member extends up and/or down from the surface of the cleaning plate to thereby effectively increase the depth of the aperture. Therefore, there is a greater axial length of the aperture by way of the tube through which the magnetic member may pass.

In one embodiment, the guide assembly may include lower guide 70*j* and upper guide 70*k*, which may be formed together or as separate structures. Guides 70*j* and 70*k* may each be tubular members, each having a first segment (70*j*' and 70*k*', respectively) with a wide diameter, a second segment (70*j*" and 70*k*", respectively) with a narrow diameter, and a step (or a tapering) between the first segment and the second segment. Guides 70*j* and 70*k* may be connectable at their first segments to define an annular groove in which the scraper 70*r* may rest. The scraper 70*r* may be installed in the guide assembly by placing the scraper 70*r* in the first segment of the lower guide, and connecting the first segment of the upper guide to that of the lower guide. Alternatively, the scraper 70*r* may be installed in the guide assembly by placing the scraper 70*r* in the first segment of the upper guide, and connecting the first segment of the lower guide to that of the upper guide. The inner diameter of first segments 70*k*' and 70*j*' may be sized to be substantially the same or slightly larger than that of the scraper ring so that the first segments can closely fit the scraper ring therewithin. The outer diameter of first segments 70*k*' and 70*j*' may be sized to prevent the tubular member from falling out of its aperture. In particular, the outer diameter of first segments 70*k*' and 70*j*' may be sized to be substantially the same or slightly less than the diameter of the holes of the middle plate such that the first segments can closely fit within the holes of the middle plate. The outer diameter of second segments 70*k*" and 70*j*" may be substantially the same or slightly smaller than that of the holes in the top plate and bottom plate, which may also therefore be smaller than the holes of the middle plate. Second segments 70*k*" and 70*j*" may thereby form a shoulder of the tubular member to fit radially within the hole of the middle plate and are axially secured between the top and bottom plates.

The cleaning plate may be sized to fit closely within the housing (or the sleeve, if present) such that there may be little to no radial distance between the cleaning plate and the inner wall of the housing. In other words, the cleaning plate may have a diameter that is substantially the same or slightly smaller than that of the inner wall of the housing. The cleaning plate may thereby force ferrous material to remain on the leading side of the cleaning plate as the cleaning plate travels down the magnetic members.

In one embodiment, the cleaning plate includes an annular protrusion 70*g*, sized to fit closely within the housing. Annular protrusion 70*g* may have a diameter that is substantially the same or slightly larger than that of the housing. Annular protrusion 70*g* may extend beyond the outer diameter of one or more of the top, middle, and bottom plates. Annular protrusion 70*g* may be made of a soft (for example, resiliently deformable) material so that it may flex, and thereby scrape (for example, wipe), as the annular protrusion 70*g* travels along the housing.

The remaining plates, including top, middle, and bottom plates, may have a smaller diameter than the annular protrusion. In the illustrated embodiment, annular protrusion 70*g* is positioned above top plate 70*t*. Annular protrusion 70*g* may be sandwiched between isolation support plates 70*g*', which may or may not have a smaller diameter compared to annular protrusion 70*g*.

The cleaning plate may have a releasable pin 70*sp* connectable to another component of the apparatus, such as the header, to hold the cleaning plate axially in place when movement of the cleaning plate is not desired, such as during shipping, during which vibration may give rise to axial movement of the cleaning plate.

The cleaning plate may include (for example, above the top plate) a hub 70*p*, connectable to via a flange 70*n* to a driver 74 for moving the cleaning plate along the members 60 (discussed further below). Hub 70*p* may be axially thicker and/or have a smaller radius than one or more of the other places of the cleaning plate. Hub 70*p* may have radially extending spokes. The driver may be connected to substantially the centre of hub 70*p* such that the force of the driver is radially disbursed by hub 70*p* on the cleaning hub. Put another way, hub 70*p* may act to disburse axial pressure, from the driver on the hub, more radially evenly on the cleaning plate.

Driver

As noted above, driver 74 may be employed to adjust the axial position of the cleaning plate 70 within the housing, causing apertures 72 to pass along the length of the magnetic separator members 60, causing the cleaning plate 70 to slide from the first ends 62 of the magnetic members 60 to the second ends 64 (or vice versa) of the magnetic members 60, thereby scraping off particles of magnetic material that have collected on the magnetic members 60. The particles of magnetic materials (or contaminants), once forced from the magnetic members 60, may drop down into the bottom of the housing 20, where they can be collected and removed through drain 80.

Once the cleaning plate 70 passes over magnetic members 60 to clean them, the driver 74 may slide the cleaning plate 70 back into its initial position proximate the first ends 62.

The driver may be manually or automatically activated from outside the housing.

For example, the driver may be activated remotely. The driver may be releasable, that is, a worker may be able to attach and detach the driver as needed, without affecting operation of the system 10. The driver has a driving mechanism, which may include, for example, a manual gear or a motor and drive shafts, links, cylinders, etc. to communicate movement to plate 70. In an embodiment with a manual driver, the driver may include a drive stem connected to an exterior controller exposed on the outer surface of the housing, the controller configured to extend and retract the drive stem to thereby push down or pull up the cleaning plate relative to the header. In a powered embodiment, a motor can be connected to operate the drive stem. The motor can be directly or automatically operated. The driver can be fully inside the housing, or have parts within and outside of the housing.

Figure 4:
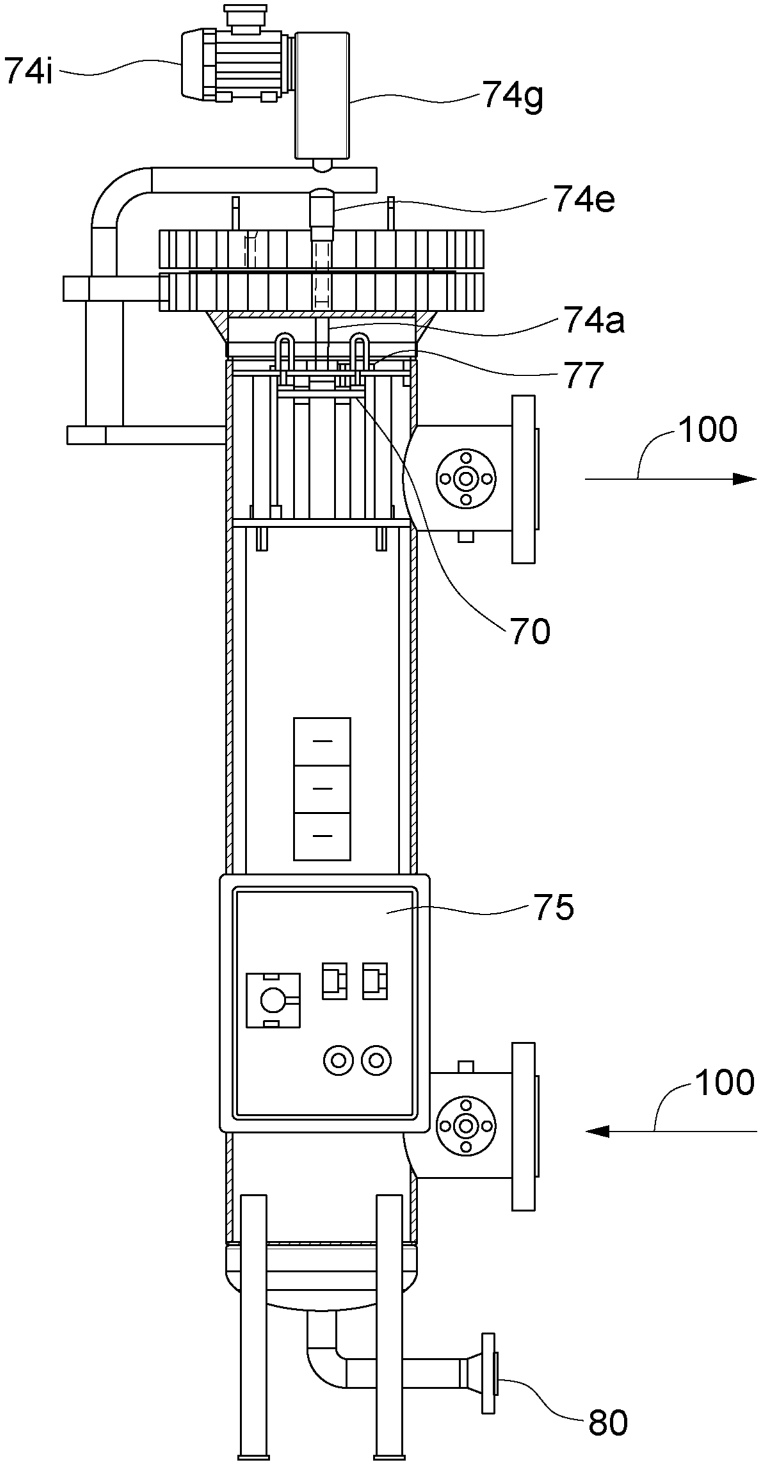
FIG. 4 is a partly cutaway schematic elevation illustration of another magnetic separation system.

Reference is made to FIGS. 4 and 5. In one embodiment, driver 74 may include a drive stem **74*a*, connected to the cleaning plate and extending upward therefrom, configured to extend and retract, for example telescopically, and provided to adjust the distance between the header and the cleaning plate. Drive stem 74*a* may be in communication with a drive stem access structure 74*c*, such as a gear, on the exterior of the housing and provided to allow access to the drive stem, for example to allow engagement with a removable driving mechanism. Driver 74 may include a packing gland 74*e* between housing 20 and a driving mechanism or the drive stem, provided to create a seal and prevent leaks from the housing. Driver 74 may include reduction gearbox 74*g* provided to control the speed and torque delivered by the driving mechanism. Driver 74 may include motor 74*i***, being the driving mechanism provided to drive the drive stem.

With reference to FIG. 4, the invention may include an automatic motor control 75. In one embodiment, control 75 is on the housing.

View Port

With reference to FIGS. 1 and 5, there may be a view port 59 installed on the housing, allowing a worker to view the housing's interior. This allows a worker to observe the amount of ferrous material that has accumulated on the magnetic members. The view port may include a window through the housing. There may be an opening in sleeve 58, in an embodiment where the sleeve is present.

Duplex System

Figure 6A:
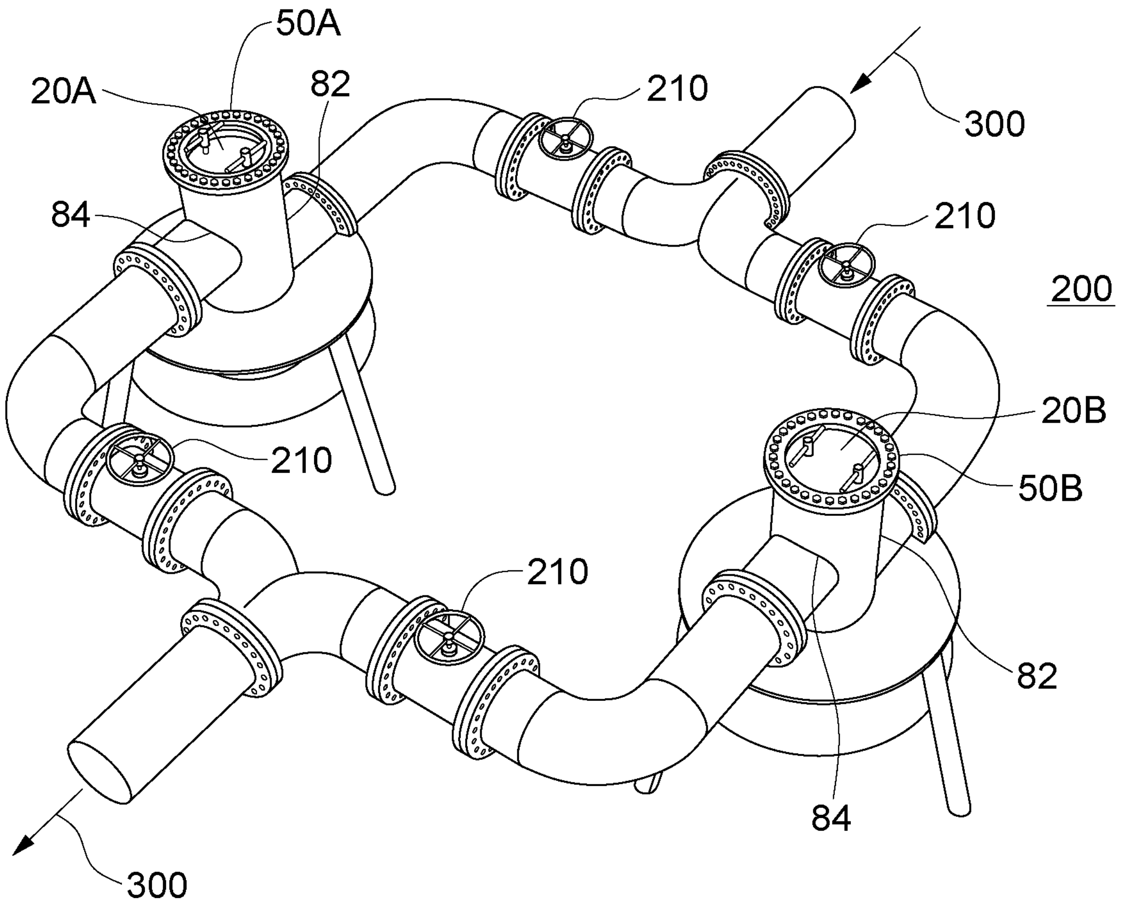
FIG. 6A is a perspective view of a duplex separator system according to one embodiment of the present invention.

FIG. 6A illustrates a duplex separator system 200 that is employed to allow continuous operation of a pipeline 300, even during cleaning. The duplex separator system 200 has a first housing 20A, a first magnetic separator assembly 50A, a second housing 20B, a second magnetic separator assembly 50B. A fluid flow passing through the pipeline 300 can be routed through either and/or both of the first housing 20A containing the first magnetic separator assembly 50A or the second housing 20B containing the second magnetic separator assembly 50B. A series of valves 210 allow the selective routing of the flow of fluid through the first housing 20A and the first magnetic separator assembly 50A and/or the second housing 20B and the second magnetic separator assembly 50B.

The duplex separator system 200 allows the a flow of fluid being routed through the pipeline 300 to be routed through one of the housings 20A, 20B and the corresponding magnetic separator assembly 50A, 50B while the other is being cleaned. For example, FIG. 6A shows the second magnetic separator assembly 50B being cleaned while the flow is routed through the first housing 20A and first magnetic separator assembly 50A. In this manner, the fluid flow passing through the pipeline 300 can be maintained while one of the magnetic separator assemblies 50A, 50B is being cleaned, avoiding having to shut down the entire pipeline 300.

Figure 6B:
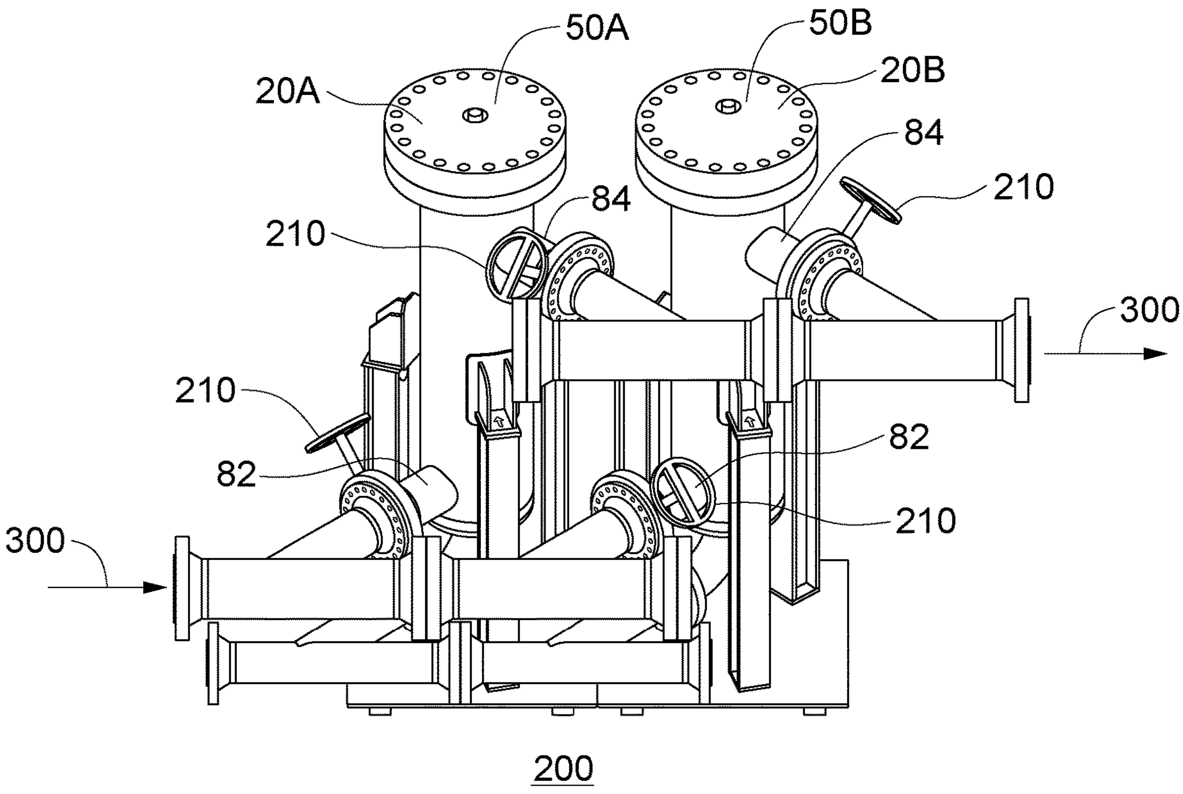
FIG. 6B is a perspective view of a duplex separator system according to another embodiment of the present invention; and (n)

FIG. 6B illustrates a duplex separator system similar to that of FIG. 6A, wherein the inlets 82 and outlets 84 are connected to the pipeline at a substantially 45 degree angle (rather than 90 degrees as illustrated in FIG. 6A) to reduce flow restriction between the pipeline and the magnetic separator assemblies 50A and 50B. While 45 degrees is used as an example, it is to be appreciated that any angle may be used, a lower angle corresponding to a greater reduction in flow restriction.

Further Embodiments

The invention may further include magnetic array 77.

In one aspect, the magnetic separation system 10 can be constructed for, but not limited to, pipelines from 12" to 48" in diameter and the housing 20 may, in one embodiment, house up to forty (40) magnetic members 60. While various sizes and ratings are useful, in one embodiment, each magnetic member 60 may be for example 2" diameter and 6 feet in length and each may weigh approximately 80 lbs with the holding capacity in excess of 200 lbs.

Clauses

Clause 1. An apparatus for magnetically separating a fluid flow passing through a pipeline, the system comprising: a housing for connection inline with the pipeline and including an inner chamber defining an internal flow path for the fluid flow passing through the pipeline to pass through the housing, the housing having an inlet and an outlet for fluid communication with the pipeline; a magnetic separator assembly in the inner chamber having a header and a magnetic member attached to the header at a first end and extending away from the header to a second end; a cleaning plate having an aperture extending through the cleaning plate, the aperture positioned on the cleaning plate to correspond with the magnetic member so that the magnetic member can slide through the aperture in the cleaning plate and the cleaning plate can be moved along the magnetic member; a driver for the cleaning plate adapted to slide the cleaning plate back and forth along the magnetic member from proximate the first end to proximate the second end; a nozzle in the housing, adapted to direct a spray stream onto the magnetic member; and a drain on the housing.

Clause 2. The apparatus of any one or more of clauses 1-20 further comprising a sleeve sized to fit within the housing and around the magnetic member.

Clause 3. The apparatus of any one or more of clauses 1-20 wherein the sleeve has a tapered end proximate the second end.

Clause 4. The apparatus of any one or more of clauses 1-20 wherein the sleeve is made of a material selected to shield a magnetic field produced by the magnetic member from the housing and the housing is made of a magnetically attractive material.

Clause 5. The apparatus of any one or more of clauses 1-20 wherein the driver is adapted to be manually activated from outside the housing.

Clause 6. The apparatus of any one or more of clauses 1-20 wherein the driver is adapted to be automatically activated from outside the housing.

Clause 7. The apparatus of any one or more of clauses 1-20 wherein the driver is adapted to be semi-automatically activated from outside the housing.

Clause 8. The apparatus of any one or more of clauses 1-20 further comprising a tube within the inner chamber, the tube extending axially downwards from an opening proximate the first end, and, proximate the second end, bending radially outwards to connect the tube to the outlet, to thereby direct flow.

Clause 9. The apparatus of any one or more of clauses 1-20 wherein there is a plurality of magnetic members being positioned uniformly around the tube.

Clause 10. The apparatus of any one or more of clauses 1-20 wherein the inlet is positioned on the opposite side of the housing relative to the outlet.

Clause 11. The apparatus of any one or more of clauses 1-20 further comprising a view port on the housing adapted to allow visual observation of the housing's interior.

Clause 12. The apparatus of any one or more of clauses 1-20, wherein the cleaning plate includes a scraper.

Clause 13. The apparatus of any one or more of clauses 1-20, wherein the aperture includes a scraper, the scraper being laterally moveable, the cleaning plate thereby being configured to ride along the outer surface of the magnetic member.

Clause 14. The apparatus of any one or more of clauses 1-20, wherein the cleaning plate further includes a top plate, a middle plate secured beneath the top plate, a bottom plate secured beneath the middle plate, the aperture is defined by a top hole in the top plate, a middle hole in the middle plate, and a bottom hole in the bottom plate; the top hole, middle hole, and bottom hole sharing a centre point; the top hole and the bottom hole having a first diameter, the first diameter being larger than a diameter of the magnetic members, and the middle hole having a second diameter larger than the first diameter; a scraper ring having an outer diameter between the first diameter and the second diameter, and an inner diameter substantially the same as the diameter of the magnetic members; and the scraper ring positioned in the middle hole and between the top plate and the bottom plate, the scraper being capable of lateral movement within the middle hole; and the cleaning plate thereby being configured to accommodate warping of the magnetic member.

Clause 15. The apparatus of any one or more of clauses 1-20, further comprising: a tubular member installed in the aperture, having an annular shoulder sized to fit radially tightly within the middle hole and axially between the top plate and bottom plate, and an annular groove in which the scraper ring may rest.

Clause 16. The apparatus of any one or more of clauses 1-20, further comprising an annular protrusion extending beyond the cleaning plate.

Clause 17. An apparatus for magnetically separating a fluid flow passing through a pipeline, the system comprising: a housing, being made of a magnetically attractive material, for connection inline with the pipeline and including an inner chamber defining an internal flow path for the fluid flow passing through the pipeline to pass through the housing, the housing having an inlet and an outlet for fluid communication with the pipeline; a magnetic separator assembly in the inner chamber having a header and a magnetic member attached to the header at a first end and extending away from the header to a second end; a sleeve sized to fit within the housing and around the magnetic member, the sleeve being made of a material selected to shield a magnetic field produced by the magnetic member from the housing; and a drain on the housing.

Clause 18. The apparatus of any one or more of clauses 1-20, wherein: the sleeve extends from an axial distance below the header such that there is an axial length of the magnetic member around which the sleeve does not surround the magnetic member.

Clause 19. The apparatus of any one or more of clauses 1-20, further comprising: a view port on the housing positioned axially between the header and the sleeve, the view port adapted to allow visual observation of the housing's interior.

Clause 20. The apparatus of any one or more of clauses 1-20, further comprising: a first view port on the housing adapted to allow visual observation of the housing's interior; and a second view port on the sleeve, radially aligned with the first view port, adapted to allow visual observation of the sleeve's interior.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims.

The invention claimed is:

1. An apparatus for magnetically separating a fluid flow passing through a pipeline, comprising:

a housing, being made of a magnetically attractive material, for connection inline with the pipeline and including an inner chamber defining an internal flow path for the fluid flow passing through the pipeline to pass through the housing, the housing having an inlet and an outlet for fluid communication with the pipeline;

a magnetic separator assembly in the inner chamber having a header and a magnetic member attached to the header at a first end and extending away from the header to a second end;

a sleeve sized to fit within the housing and around the magnetic member, the sleeve being made of a material selected to shield a magnetic field produced by the magnetic member from the housing;

a drain on the housing; and wherein the sleeve extends from an axial distance below the header such that there is an axial length of the magnetic member around which the sleeve does not surround the magnetic member.

2. The apparatus of claim 1, further comprising:

a view port on the housing positioned axially between the header and the sleeve, the view port adapted to allow visual observation of the housing's interior.

3. An apparatus for magnetically separating a fluid flow passing through a pipeline, comprising:

a housing, being made of a magnetically attractive material, for connection inline with the pipeline and including an inner chamber defining an internal flow path for the fluid flow passing through the pipeline to pass through the housing, the housing having an inlet and an outlet for fluid communication with the pipeline;

a magnetic separator assembly in the inner chamber having a header and a magnetic member attached to the header at a first end and extending away from the header to a second end;

a sleeve sized to fit within the housing and around the magnetic member, the sleeve being made of a material selected to shield a magnetic field produced by the magnetic member from the housing;

a drain on the housing;

a first view port on the housing adapted to allow visual observation of the housing's interior; and a second view port on the sleeve, radially aligned with the first view port, adapted to allow visual observation of the sleeve's interior.

* * * * *